United States Patent Office 3,182,089
Patented May 4, 1965

3,182,089
METHOD OF PREPARING 2,4,6-TRIIODINATED AROMATIC COMPOUNDS
Godfrey Wilbert, Carmel, N.Y., assignor to Nepera Chemical Co., Inc., Harriman, N.Y., a corporation of New York
No Drawing. Filed Jan. 31, 1961, Ser. No. 85,961
5 Claims. (Cl. 260—623)

The present invention relates to an iodination process and in particular to a new and novel method of preparing triiodinated compounds of the formula:

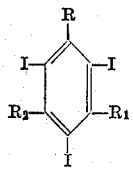

wherein R is hydroxy or lower alkoxy and $R_1$ and $R_2$ are hydrogen, hydroxy, lower alkoxy, the acyl radical of a lower alkyl carboxylic acid or lower alkyl.

The terms "lower alkyl" and "lower alkoxy" as used throughout the specification and in the claims refer to straight and branched chain aliphatic groups having 1 to 6 carbon atoms.

The compounds of the above formula are valuable intermediates for the production of radio-opaque compounds useful in rendering areas of the body opaque for X-ray examination. For example, 2,4,6-triiodophenol may be reacted with ethyl α-bromobutyrate as described in U.S. Patent 2,796,432 to form α-(2,4,6-triiodophenoxy) butyric acid, a valuable radio-opaque compound useful in X-ray examination of the gall bladder.

The classical method of iodinating phenols or phenol derivatives to obtain 2,4,6-triiodinated products is the use of an aqueous solution of potassium iodide as a solvent for the iodine, since iodine is only slightly soluble in water alone. However, even with such a potassium iodide solution as a reaction medium, large volumes of water are required to insure that the iodine necessary for the reaction is wholly in solution. This complicates the recovery of the iodinated products at the conclusion of the reaction with a result that low yields are generally obtained. Furthermore, the use of potassium iodide adds significantly to the cost of manufacture since as much as 2 pounds of potassium iodide are required per pound of product produced.

It has also been observed that the triiodinated products obtained in the prior art iodination process described above are not always analytically pure. For example, the iodination of phenol in an aqueous iodine-potassium iodide system yields 2,4,6-triiodophenol having a melting point 3 to 4° C. below that of analytically pure material, indicating the presence of impurities. Where the triiodinated compound is to be used as an intermediate in the preparation of compounds for internal administration to humans, it is apparent that the presence of even small amounts of impurities is undesirable.

An object of this invention is to provide a method of preparing 2,4,6-triiodinated aromatic compounds at high yields.

A further object of this invention is to provide a method of preparing 2,4,6-triiodinated aromatic compounds having a high purity.

Other objects and the advantages of my invention will become apparent from the following detailed description.

I have now found that the aforementioned objects are fulfilled by reacting a compound of the formula:

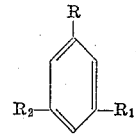

where R, $R_1$ and $R_2$ are as described hereinabove with iodine in an aqueous alkaline reaction medium containing dimethylformamide or dimethylacetamide. The products of the formula:

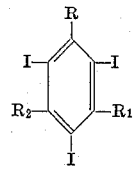

are obtained at high yields and in high purity.

Among the starting materials which may be reacted with iodine to form their 2,4,6-triiodinated derivatives are phenol, methoxybenzene, ethoxybenzene, 1,3-dihydroxybenzene, 1,3,5-trihydroxybenzene, m-cresol, 3,5-dimethylphenol, 3-ethylphenol, 3-acetylphenol, 3,5-diacetylphenol, 3-acetyl-5-methylphenol, 3,5-diethoxyphenol and the like. It has been found that the method of this invention is a particularly effective method of preparing 2,4,6-triiodophenol from phenol.

In carrying out the method of this invention, an aqueous alkaline solution of the starting material is first prepared. Suitable alkaline materials are the alkali metal hydroxides, such as sodium hydroxide and potassium hydroxide, present in an amount in excess of three times the molar quantity of the starting material.

A solution of iodine in dimethylformamide or dimethylacetamide is prepared, the molar quantity of iodine present normally being about three times the molar quantity of the starting material in the aqueous alkaline solution to insure stoichiometric amounts of the reactants in the reaction mixture. The quantity of the solvent dimethylformamide or dimethylacetamide is normally such that a solution of between about 45 percent and 55 percent by weight of iodine is obtained.

The aqueous alkaline solution of the starting material is heated to a temperature within the range of about 40° C. to 60° C. and the iodine solution is added thereto with vigorous agitation over a period of between about 5 and about 30 minutes, while the temperature of the reaction mixture is maintained within the above limits.

At the conclusion of the addition of the iodine solution, the reaction mixture may be agitated for an additional period of time, up to about 1 hour at the reaction temperature, after which it is processed for recovery of the 2,4,6-triiodinated product therefrom. Recovery may be effected by acidifying the reaction mixture, which results in precipitation of the product, which then is recovered by filtration. The product may conveniently be further purified by precipitation from an aqueous alkaline solution thereof by the addition of acid followed by recrystallization from solvents such as toluene.

The 2,4,6-triiodinated product is obtained at high purity by the method of this invention. In addition, the concentration of the product in the reaction mixture is up to three times that obtainable by iodination methods of the prior art where the solvent for iodine is an aqueous potassium iodide solution. Thus, recovery of the product from the reaction mixture is facilitated and product yields are improved compared to those obtained in prior art iodination methods. Since the use of expensive potassium iodide is eliminated, manufacturing costs are reduced.

The following examples are included in order further to illustrate the method of this invention:

*Example 1*

A solution of 36.8 grams of 88 percent phenol and 70.4 grams of potassium hydroxide in 800 ml. water is heated to 45° C. and to the heated solution is added over a period of 15 minutes a solution of 254.4 grams of iodine in 250 ml. dimethylformamide. The reaction mixture is vigorously agitated during the addition and the temperature maintained between 45° C. and 50° C. Agitation is continued for an additional 45 minutes, with the temperature being maintained within the above range. During this period the color of the reaction mixture lightens considerably from the original dark reddish-brown color.

The pH of the mixture is adjusted to about 5.5 by the addition of acetic acid, the mixture is then cooled to 25° C. and the precipitate, constituting 2,4,6-triiodophenol, is recovered by filtration and washed with water. The yield is 93 percent of theory.

The product is suspended in 1150 ml. water to which has been added 40 ml. of a 50 percent by weight aqueous solution of sodium hydroxide. Activated charcoal is added, the mixture is filtered, the filtrate acidified to pH 6.0 with 50 percent $H_2SO_4$ and the precipitate is recovered by filtration. Recrystallization from toluene yields pure 2,4,6-triiodophenol having a melting point of 159° C. to 161° C.

*Example 2*

The method described in Example 1 is repeated, using dimethylacetamide in place of dimethylformamide. The product 2,4,6-triiodophenol is obtained at a yield and purity comparable to the results of Example 1.

*Example 3*

A solution of 9.5 g. m-cresol and 16.3 g. potassium hydroxide in 187 ml. water is heated to 45° C. To this solution is added over a ten minute period a solution of 67.2 g. iodine in 58 ml. dimethylformamide, the temperature being maintained between 48° C. and 58° C. The reaction mixture is agitated during the addition and for 15 minutes thereafter. The mixture is then cooled to 25° C. and the pH adjusted to 5.5 with acetic acid.

The precipitate is recovered by filtration and suspended in 500 ml. water. 50 percent sodium hydroxide solution is added until a solution is obtained. Activated charcoal is added, the mixture is filtered and the filtrate acidified with 50 percent sulfuric acid to pH 6.0. The precipitate is recrystallized from toluene to yield 2,4,6-triiodo-m-cresol, melting point 111–115° C.

It is understood that the foregoing detailed description is given merely by way of illustration and that many variations may be made therein without departing from the spirit of my invention.

Having described my invention, what I desire to secure by Letters Patent is:

1. A method of preparing compounds of the formula

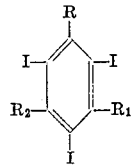

wherein R is a member selected from the group consisting of hydroxy and lower alkoxy and $R_1$ and $R_2$ are members selected from the group consisting of hydrogen, lower alkyl, hydroxy, lower alkoxy and the acyl radical of a lower alkyl carboxylic acid which comprises adding a solution of iodine in a solvent selected from the group consisting of dimethylformamide and dimethylacetamide to an aqueous alkaline solution of a starting compound of the formula

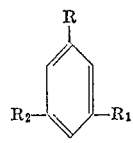

while maintaining the temperature of the reaction mixture between about 40° C. and about 60° C.

2. A method according to claim 1 wherein the molar ratio of iodine to said starting compound is 3 to 1, said iodine solution contains about 45 to about 55 percent by weight of iodine, and said aqueous alkaline solution of the starting compound contains an alkali metal hydroxide in a molar quantity in excess of three times the molar quantity of said starting compound.

3. A method according to claim 2 wherein said iodine solution is added to said aqueous alkaline solution of the starting compound over a period of about 5 to about 30 minutes.

4. A method of preparing 2,4,6-triiodophenol which comprises adding a solution of iodine in dimethylformamide to an aqueous alkaline solution of phenol over a period of about 5 to about 30 minutes while maintaining the temperature of the reaction mixture between about 40° C. and about 60° C.

5. A method according to claim 4 wherein the molar ratio of iodine to phenol is about 3 to 1, said iodine solution contains about 45 to about 55 percent by weight of iodine and said aqueous alkaline solution of phenol contains an alkali metal hydroxide in a molar quantity in excess of three times the molar quantity of said phenol.

References Cited by the Examiner

FOREIGN PATENTS 106,504  10/99  Germany.
5,288   1/85   Great Britain.

OTHER REFERENCES

Bunnett et al.: Jour. Organic Chem., vol. 23 (February 1958), pages 305 305–306 (2 pages).

"DMF Product Information" (A–6011 (h) (April 1, 1954), p. 17 (entire publication 24 pages)), pub. by E. I. Dupont de Nemours & Co. (Inc.), Wilmington, Delaware (copy in 260–950 (38) Solvents Digest in Group 130–84).

Potts: Chem. Soc. Jour. (London) (1953), pp. 3711–12.

LEON ZITVER, *Primary Examiner.*

CHARLES B. PARKER, HAROLD G. MOORE, *Examiners.*